United States Patent [19]

Todhunter et al.

[11] Patent Number: 4,539,928
[45] Date of Patent: Sep. 10, 1985

[54] TIRE EQUALIZER AND INDICATOR

[75] Inventors: Gordon R. Todhunter, Brentwood; James W. Grim, Nashville, both of Tenn.

[73] Assignee: Scovill Inc., Waterbury, Conn.

[21] Appl. No.: 519,031

[22] Filed: Aug. 1, 1983

[51] Int. Cl.³ ............................................. B60C 23/02
[52] U.S. Cl. ................................... 116/34 R; 116/271; 116/285; 73/146.8
[58] Field of Search ................ 73/146.2, 146.8, 146.3; 116/34 R, 271, 285; 137/557

[56] References Cited

U.S. PATENT DOCUMENTS

| | | | |
|---|---|---|---|
| 1,686,089 | 10/1928 | Kennedy et al. | 116/34 R |
| 1,882,455 | 10/1932 | Spicer | 116/34 R |
| 3,236,097 | 2/1966 | Tessmer | 116/34 R |
| 4,058,009 | 11/1977 | Etter-Felix | 73/146.8 |
| 4,240,372 | 12/1980 | Davis | 116/271 |
| 4,375,788 | 3/1983 | Malec | 116/34 R |

OTHER PUBLICATIONS

*Mechanical Movements*, Henry T. Brown, pp. 28-29, 1893.

*Primary Examiner*—Charles Frankfort
*Assistant Examiner*—W. Morris Worth
*Attorney, Agent, or Firm*—Dallett Hoopes

[57] ABSTRACT

A tire equalizer comprises a housing having upper and lower chambers divided by a flexible diaphragm opposing a seat in the upper chamber connected to one of the tires. The diaphragm is urged toward the seat by a spring-pressed inverted cup larger in diameter than the diaphragm and having an arm extended longitudinally from the cup away from the spring. The arm is curved in horizontal cross-section and its upper end is formed with a slot receiving an off-center pin on the back of an indicator disc. Also connected to the upper chamber is a fill conduit, and a conduit to the other tire.

3 Claims, 6 Drawing Figures

TIRE EQUALIZER AND INDICATOR

BACKGROUND OF THE INVENTION

1. Field of the Invention

This invention relates to a dual tire pressure equalizer and indicator.

More specifically, this invention relates to such devices having a rotary indicator adapted to show in a general way the pressure within the dual tire system and to indicate when the pressure is lower than a preset limit.

2. Description of the Prior Art

In the prior art, there have been dual tire pressure equalizers and indicators. An example is disclosed in the U.S. Pat. No. 2,427,445 which issued Sept. 16, 1947 to A. H. Davidson. In such earlier devices, a piston-operated valve exposed on one side to pressure to the dual tire pressure system, and on the other side to spring means, valves off the connection between the two tires when the pressure in the system drops. This saves both tires from going flat. Additionally, the piston has a linear extension which indicates through a transparent dome the status of the pressure in the system.

Another example of such a device is shown in the U.S. Pat. No. 1,882,455 which issued Oct. 11, 1932 to D. H. Spicer. In this patent, the pressure sensing means in the dual tire equalizer is also a piston covered by a rubber layer which, on a pressure drop, seats on a seat to close off the connection between the two tires.

The devices in the prior art have been lacking in easily readable means for indicating the pressure in the tire system.

3. Summary of the Invention

Under the present invention, the equalizer provided features a moveable wall adapted to valve off the connection between the dual tires, the moveable wall having an upstanding arm, the upper end of which is connected to a rotary indicator journaled in an opening in the equalizer housing, the indicator being masked except for a window through which only a portion of the indicator is visible. Segments of the indicator are color/coded so that the condition of the pressure may be readily seen from a distance.

BRIEF DESCRIPTION OF THE DRAWINGS

Further features of the invention will be apparent from a review of the following Specification and Claims including the attached drawings.

In the drawings.

DESCRIPTION OF THE PREFERRED EMBODIMENT

Figure 1:
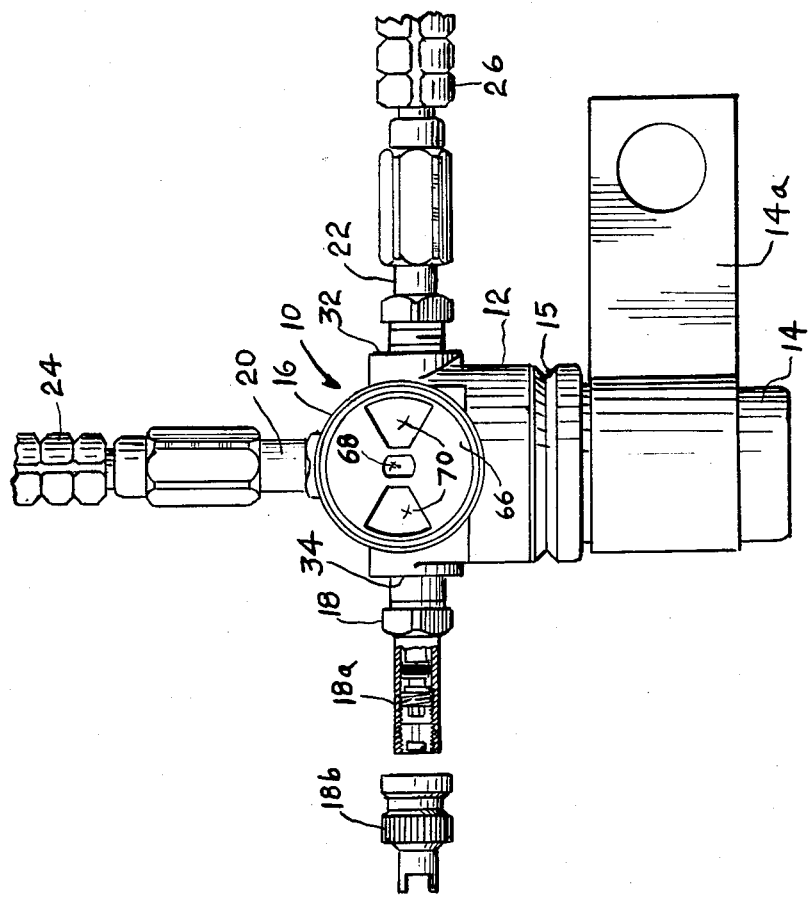
FIG. 1 is a side elevational view of an equalizer and indicator embodying the invention. To save room, various connecting tubes have been broken off.

A dual tire pressure equalizer and indicator embodying the invention is generally designated 10 in FIG. 1. It comprises an upper housing 12 which may be a die casting and a lower housing 14 which may be a drawn cup crimped onto the upper housing at 15. A bracket 14a secures the unit to the wheel. In the upper housing 12 is an indicator mount 16 and the upper housing has a fill connection 18 with a standard tire valve core 18a and cap 18b, a first tire connector 20 and a second tire connector 22, the connectors 20 and 22 attached to the respective tires by flexible tubes 24 and 26, respectively. Filter discs 25 (FIG. 3) are disposed intermediate the fittings and the body 12.

Figure 2:
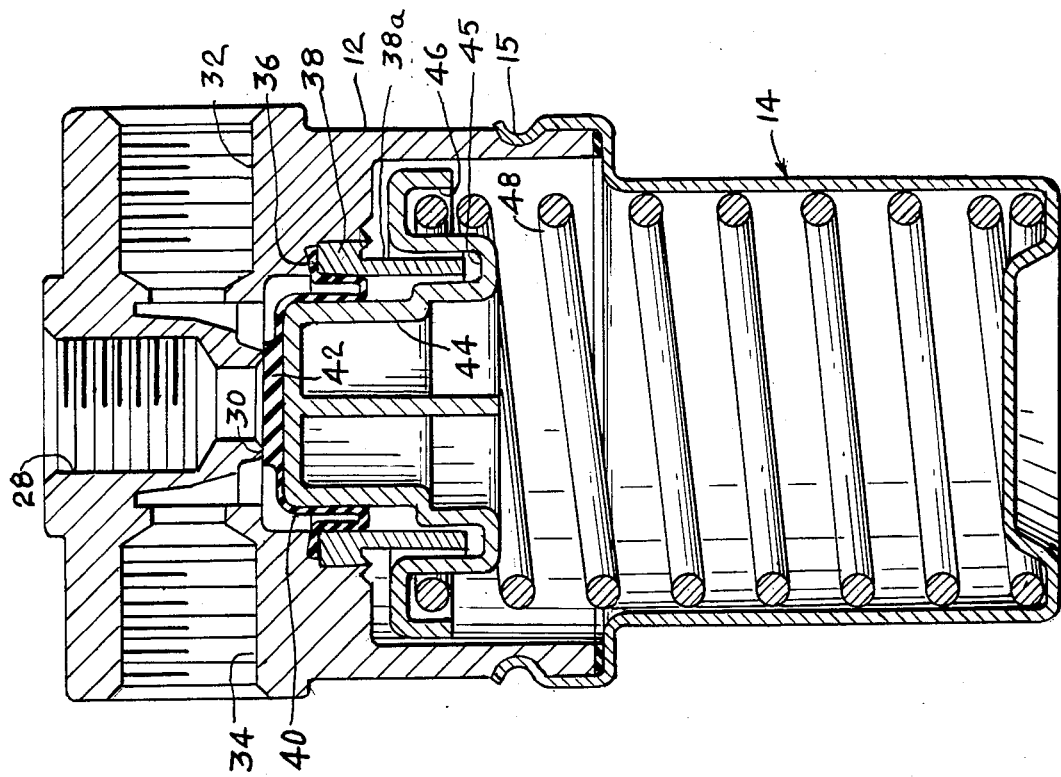
FIG. 2 is an enlarged sectional view.

The top of the upper housing 12 has a first tire connector passage 28 (FIG. 2) which terminates in an opening into the housing surrounded by a seat 30. A second tire connector passage 32 is provided into the upper chamber as well as a fill passage 34. An annular downward shelf 36 is disposed under passage 32 as shown in FIG. 2. A ring 38 clamps the periphery of a rubber diaphragm 40 against the shelf. The diaphragm may be centrally thickened as at 42. The ring 38 has a downward skirt 38a for reasons that will appear.

Supporting the central portion of the diaphragm is an inverted cup 44, the periphery of which is doubled back to present an annular upward recess 45 then redoubled back to present a downward recess 46. The upward recess receives guide skirt 38a and recess 46 receives the upper end of the spring means 48. The lower end of the spring bears against the bottom wall 50 of the cup 14.

By virtue of the structure described thus far, pressure in the upper portion of the housing will urge the diaphragm 42, cup 44 assembly downward against the upward force of the spring 48. A drop in pressure will permit the spring 48 to drive the diaphragm 42, cup 44 upward to seat on seat 30, closing off communication between the first tire connector passage 28 and second tire connector passage 32 and related parts shown in FIG. 1.

Figure 3:
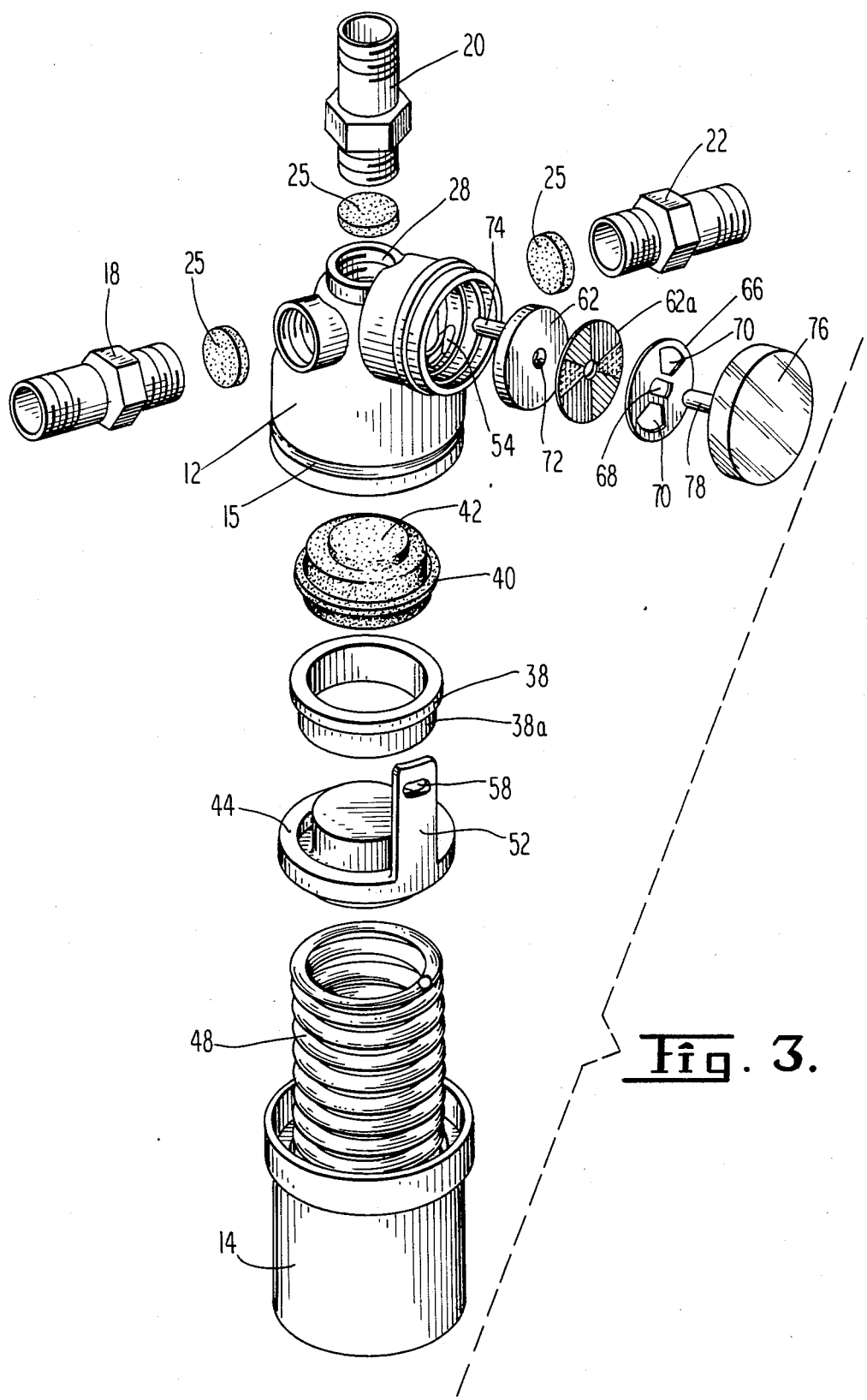
FIG. 3 is a perspective exploded view.
Figure 4:
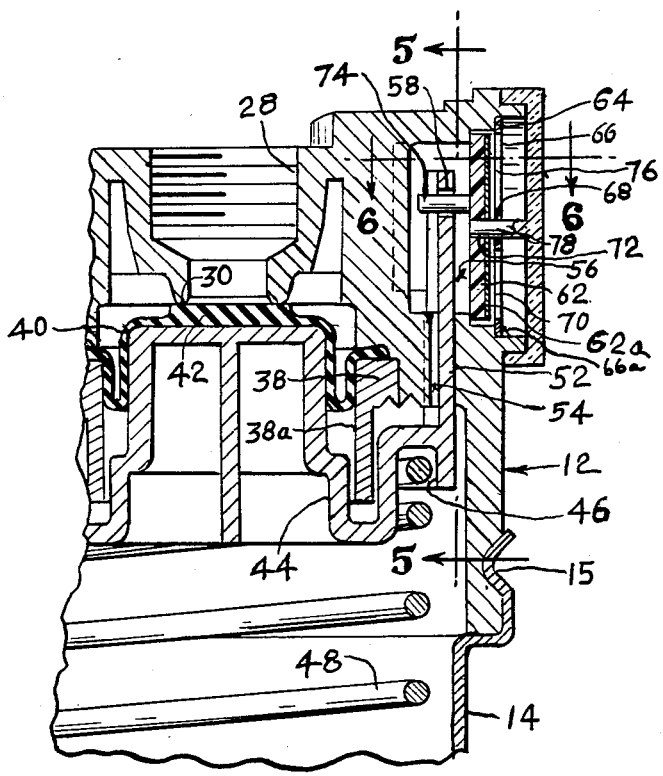
FIG. 4 is a fragmentary sectional view taken on the line 4—4 of FIG. 2.
Figure 5:
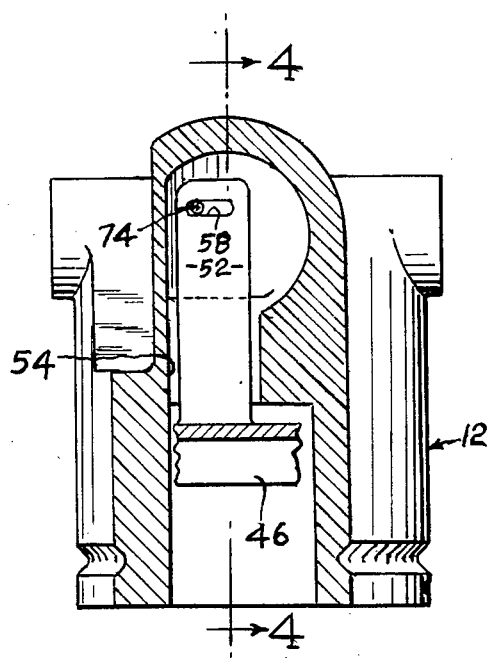
FIG. 5 is a fragmentary sectional view taken on the line 5—5 of FIG. 4.
Figure 6:
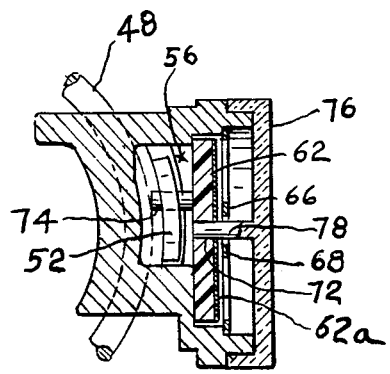
FIG. 6 is a fragmentary sectional view taken on the line 6—6 of FIG. 4

Extending upward from the periphery of the cup 44 is a curved arm 52 (FIG. 4). This arm passes through a passage 54 in the housing which communicates from the lower chamber defined particularly by cup 14 into an indicator recess 56. As shown, the upper end of the arm is slotted horizontally at 58 (FIG. 5). The portion of the housing surrounding the recess 56 is formed with an annular ledge which journals a disc 62 covered by indicator disc 62a fixedly mounted thereon. A concentric wider ledge 64 is disposed adjacent the mouth of the recess and houses a disc-shaped mask 66 which is formed with a central aperture 68 and segmental windows 70 (FIG. 3). The indicator disc 62a is also formed with a central aperture 72 and a pin 74 extends rearwardly, offset from the aperture 72 and is received into the slot 58.

A clear transparent dome 76 is provided which fits over the mouth of the housing and is formed with a central shank 78 receiving the apertures 68 and 72 on the disc 66 and 62, respectively.

In operation, the unit described is installed on the wheel of the dual assembly. The connecting tubes 24 and 26 are connected respectively to the tire valves from which the cores are removed. The two tires are then filled through the fill assembly 18. When the pressure builds up sufficiently in the upper housing, the diaphragm 40, 42 overpowers the spring 48 and unseats from seat 30 opening communication with the first tire through passage 28 as well as the second through passage 32. As the diaphragm 42 and cup 44 descend, arm 52 lowers causing the indicator disc 62 to rotate. In the initial filling when the gauging pressure at the fill fitting 18 is at a level recommended by the tire manufacturer, the masking disc 66 is rotated to show the green sector of the disc 62. The masking disc 66 is staked as at 66a (FIG. 4) to the housing in this position. If the tires are overinflated, the diaphragm and cup lowers causing the yellow sector of disc 62a to appear in the window.

When the pressure drops, diaphragm 42 and cup 44 will raise, rotating the disc to a position where the red sector of disc 62 shows through window 70 alerting the driver to add air. Should the air pressure drop further, as would be the case in a blowout situation, the diaphragm 40, cup 44 will instantaneously raise to a position where the thickened portion 42 closes off seat 30, blocking the connection between the two tires. This avoids deflation of both tires in the event one tire has a flat. Subsequent addition of air will increase the pressure in the system backing the diaphragm away from seat 30 and filling both tires simultaneously.

It will be clear from the above description that we have developed a device which not only effectively equalizes tire pressure in dual tire systems, and closes off communication in the event of a flat, but effectively indicates the condition of the pressure. The structure is simple in operation and compact in arrangement.

While the invention has been described in only one form, it is not so limited but instead encompasses all structures defined by the following claim language including equivalents thereof:

We claim:

1. A tire pressure equalizer and pressure indicator for dual tires comprising:
    (a) a housing having an upper chamber and a lower chamber separated by a sealed diaphragm, the upper chamber having:
        (1) a seat opposite the diaphragm, with a central opening, the diaphragm being adapted to seat and close off the seat,
        (2) first passage means for connecting the seat opening and one tire,
        (3) second passage means for connecting the upper chamber to the other tire, and
        (4) fill means;
    (b) an inverted cup underlying the diaphragm and radially extending well out beyond the margin of the diaphragm;
    (c) spring means in the lower chamber engaging the cup and urging the cup and diaphragm toward seating disposition;
    (d) an arm extending from the periphery of the cup longitudinally of the axis of the cup away from the spring means;
    (e) rotary indicator means comprising a disc mounted for rotation in a side of the housing;
    (f) the arm being formed with a transverse slot near its end and the disc having a pin affixed perpendicular thereto at a point spaced from the rotational axis of the disc, the pin passing through the slot whereby as pressure drops from a selected pressure, the diaphragm and cup driven by the spring, moves toward the seat and the indicator indicates a less-than-selected pressure, and when the diaphragm seats, isolating the two tires, the indicator indicates low pressure.

2. A tire pressure equalizer and pressure indicator as claimed in claim 1 wherein the arm is arcuate in horizontal cross-section.

3. A tire pressure equalizer and pressure indicator as claimed in claim 2 wherein the cup has an annular recess adjacent the periphery thereof, the recess receiving an end of the spring means.

* * * * *